United States Patent
Campbell et al.

(10) Patent No.: US 7,817,584 B2
(45) Date of Patent: Oct. 19, 2010

(54) METHOD AND SYSTEM FOR MANAGING SIMULTANEOUS ELECTRONIC COMMUNICATIONS

(75) Inventors: Christopher S. Campbell, San Jose, CA (US); Stephen P. Farrell, San Francisco, CA (US)

(73) Assignee: International Business Machines Corporation, Armonk, NY (US)

( * ) Notice: Subject to any disclaimer, the term of this patent is extended or adjusted under 35 U.S.C. 154(b) by 784 days.

(21) Appl. No.: 11/680,257

(22) Filed: Feb. 28, 2007

(65) Prior Publication Data
US 2008/0205444 A1    Aug. 28, 2008

(51) Int. Cl.
*H04L 12/16* (2006.01)
(52) U.S. Cl. ............... 370/261; 370/262; 370/235; 370/264
(58) Field of Classification Search ............. 370/465, 370/352, 235, 260, 261, 262, 264
See application file for complete search history.

(56) References Cited

U.S. PATENT DOCUMENTS

| | | | | |
|---|---|---|---|---|
| 5,369,694 | A * | 11/1994 | Bales et al. | 379/206.01 |
| 5,818,436 | A * | 10/1998 | Imai et al. | 715/203 |
| 5,818,514 | A | 10/1998 | Duttweiler et al. | |
| 5,844,597 | A | 12/1998 | Kettler et al. | |
| 6,490,553 | B2 * | 12/2002 | Van Thong et al. | 704/211 |
| 7,099,798 | B2 * | 8/2006 | Yu et al. | 702/186 |
| 7,328,239 | B1 * | 2/2008 | Berberian et al. | 709/204 |
| 7,676,033 | B2 * | 3/2010 | Madhusudan et al. | 379/202.01 |
| 2002/0002584 | A1 * | 1/2002 | Takagi et al. | 709/204 |
| 2003/0055897 | A1 | 3/2003 | Brown et al. | |
| 2003/0220973 | A1 | 11/2003 | Zhu et al. | |
| 2004/0161082 | A1 * | 8/2004 | Brown et al. | 379/93.21 |
| 2004/0263636 | A1 * | 12/2004 | Cutler et al. | 348/211.12 |
| 2005/0135333 | A1 * | 6/2005 | Rojas | 370/352 |
| 2005/0136896 | A1 | 6/2005 | Ward et al. | |
| 2005/0207542 | A1 | 9/2005 | Carroll et al. | |
| 2006/0062366 | A1 * | 3/2006 | Tiruthani et al. | 379/201.01 |

(Continued)

FOREIGN PATENT DOCUMENTS

EP    1613009 A    1/2006

OTHER PUBLICATIONS

"Design and Performance of a Stand-alone Media Server" by Khlifi et al., Proceedings of the 2005 Systems Communications (ICW'05) 0-7695-2422-2/05 IEEE.

(Continued)

*Primary Examiner*—Ricky Ngo
*Assistant Examiner*—Dewanda Samuel
(74) *Attorney, Agent, or Firm*—IP Authority, LLC; Ramraj Soundararajan

(57) ABSTRACT

A first communication channel is established between a first entity and at least one second entity and a second communication channel is established between the first entity and at least one third entity over the network. Then, data associated with the first and second communication channels are recorded. Next, first, second, and third entities are dynamically monitored to identify if first, second, or third entities is in an active or inactive state, and based upon such monitoring, recorded data are either synchronously rendering to entities in an active state or asynchronously rendered to entities in an inactive state upon the entities in the inactive state transitioning from an inactive state to an active state.

38 Claims, 8 Drawing Sheets

U.S. PATENT DOCUMENTS

2008/0005239 A1* 1/2008 Podl .......................... 709/204
2009/0116814 A1* 5/2009 Morohashi et al. ............ 386/65

OTHER PUBLICATIONS

Shriberg et al., "Observations on Overlap: Findings and Implications for Automatic Processing of Multi-Party Conversation," 7th European Conf. on Speech Communication & Technology (Eurospeech 2001), Sep. 3-7, 2001, Aalborg, Denmark, pp. 1359-1362.

Kanada, Y., "Simulated Virtual Market Place by Using voiscape Communication Medium," Proceedings of the 13th Annual ACM Int'l Conf. on Multimedia (MM'05), Nov. 6-11, 2005, Singapore, pp. 794-795.

* cited by examiner receiving a request from a third entity to join an ongoing communication between a first and second entity communicating in a synchronous mode while data are being recorded, the recorded data associated with the ongoing communication

202 rendering recorded data to the third entity at a render rate to transition the third entity from an asynchronous mode to a synchronous mode, after which the third entity participates in the ongoing voice communication between the first and second entity in real-time

METHOD AND SYSTEM FOR MANAGING SIMULTANEOUS ELECTRONIC COMMUNICATIONS

FIELD OF INVENTION

The present invention relates generally to the field of electronic communications (video, audio, data, etc.). More specifically, the present invention is related to a method and system for managing simultaneous electronic communications.

BACKGROUND OF THE INVENTION

In today's services and knowledge-based organizations, work processes are complex and dynamic, requiring fast and effective coordination among large numbers of people across teams, departments, geographies, and time-zones. Organizations that can maximize the quantity and quality of coordination, communication, and relationship building will be able to provide higher quality services at lower costs. Various studies have shown that multi-tasking across many people and systems is central to productivity and project success. This is supported by research showing that multi-tasking with information technology significantly increases productivity and revenue in a services delivery company. Over a period of five years, a study of a large "head-hunting" firm found that people who used information technology to increase multi-tasking had shorter project times and greater revenue than people who used less information technology (e.g., preferring to use phone and face-to-face meetings).

Ethnographic studies of large knowledge service companies have shown that IT administrators, for example, attempt to multi-task their communications with many team members including IT architects, other administrators, management, project leads, etc. to quickly configure and deliver complex IT systems. As many as 20 independent conversations may be maintained across multiple communications tools (e.g., phone, IM chat sessions, email, voicemail, system messaging, system monitoring tools, face-to-face, etc.) at one time. This massive coordination is required for IT administrators to design and manage highly complex, fault-tolerant systems.

Unfortunately, all of the current tools that support electronic communications are non-optimal in such a dynamic environment. Specifically, phones, video conferencing, voicemail, instant messaging (IM), and email impose costs in communication including distraction, interruption, communication failures, loss of context, and wasted effort.

Email and IM have been useful in coordinating communications with more people than can be achieved with other communications tools (e.g., phone), because it allows the speed of interaction or communications synchrony to vary widely. The problem with IM, however, is that it requires a great deal of effort to type and compose text messages, does not convey emotional subtext very well, and does not integrate well with voice communications modes (e.g., phone, VOIP). Email also suffers from the requirement of typing and composing text messages and provides less communications synchrony making fast, effective communication difficult.

The following references provide general background in the area of instant communication, but fail to teach or suggest the present invention.

The non-patent literature titled "Simulated Virtual Market Place by Using Voiscape Communication Medium" by Yasusi Kanada teaches a voice communication medium called voiscape that enables natural and seamless bi-directional voice communication by using sound to create a virtual sound room.

The non-patent literature titled "Design and Performance of a Stand-alone Media Server" by Khlifi et al. teaches a media server used in VOIP systems for audio interactions with users, NAT traversal, call monitoring, and media recording.

The non-patent literature titled "Observations on Overlap: Findings and Implications for Automatic Processing of Multi-Party Conversation" by Shriberg et al. teaches distribution of overlapping speech in different corpora of natural multi-party conversations, including two types of meetings and two corpora of telephone conversations.

The patent to Duttweiler et al. (U.S. Pat. No. 5,818,514) teaches a video conferencing system and method for providing enhanced interactive communication. According to Duttweiler, a delay is inserted into the audio transmission path to provide lip synchronization of the image and speech of the respective users.

The patent to Kettler et al. (U.S. Pat. No. 5,844,597) teaches a method of transmitting signals between communications in which a central control station is adapted to transmit a picture of virtually real ambience to each connected station.

The pre-grant publication to Michael Rojas (2005/0135333) teaches a system and method for instant VOIP messing.

The pre-grant publication to Tiruthani et al. (2006/0062366) teaches an overlapped voice conversation system and method wherein two or more calls to the same destination are mixed and the mixed audio information includes foreground and background calls. The call in the foreground is mixed with a higher volume level than background calls.

The patent to Carroll et al. (2005/0207542) teaches a system and method for on-demand recording of telephone, computer, or video signals.

Whatever the precise merits, features, and advantages of the above cited references, none of them achieves or fulfills the purposes of the present invention.

SUMMARY OF THE INVENTION

The present invention provides for a method comprising the steps of: (a) establishing a first communication channel between a first entity and at least one second entity and establishing a second communication channel between the first entity and at least one third entity; (b) recording data associated with the first and second communication channels; (c) dynamically monitoring the first, second, and third entities to identify if each of said first, second, or third entity is in an active or inactive state, and (d) synchronously rendering the recorded data to entities in an active state and asynchronously rendering the recorded data to entities in an inactive state upon the entities in the inactive state transitioning from an inactive state to an active state.

The present invention also provides for a method comprising the steps of: (a) receiving a request from a third entity to join an ongoing communication between a first entity and a second entity, the first and second entities communicating in a synchronous mode while data are being recorded, the recorded data associated with the ongoing communication being recorded; and (b) rendering the recorded data to the third entity at a render rate to transition the third entity from an asynchronous mode to a synchronous mode, after which the third entity participates in the ongoing communication between said first and second entity in real-time.

The present invention also provides for a method comprising the steps of: (a) establishing a first communication channel between a first entity and at least one second entity and establishing a second communication channel between the first entity and at least one third entity; (b) recording data associated with the first and second channels; (c) dynamically monitoring the first, second, and third entities to identify if each of the first, second, and third entity is in an active or inactive state; (e) synchronously rendering the recorded data to entities in an active state; (f) receiving an indication that an inactive entity has transitioned from an inactive state to an active state; (g) identifying a render rate at which the recorded data are to be rendered for the entity that transitioned from the inactive state to the active state, and (g) asynchronously rendering the recorded data to the entity that transitioned from the inactive state to the active state at the identified render rate.

The present invention also provides for an article of manufacture comprising a computer usable medium having computer readable program code embodied therein, wherein the medium comprises: computer readable program code aiding in establishing a first communication channel between a first entity and at least one second entity and establishing a second communication channel between the first entity and at least one third entity; computer readable program code aiding in recording data associated with the first and second communication channels; computer readable program code dynamically monitoring the first, second, and third entities to identify if each of the first, second, or third entity is in an active or inactive state, and computer readable program code synchronously rendering the recorded data to entities in an active state and asynchronously rendering the recorded data to entities in an inactive state upon the entities in the inactive state transitioning from an inactive state to an active state.

The present invention also provides for an article of manufacture comprising a computer usable medium having computer readable program code embodied therein, wherein the medium comprises: computer readable program code aiding in receiving a request from a third entity to join an ongoing communication between a first entity and a second entity, the first and second entity communicating in a synchronous mode while data are being recorded, said recorded data associated with the ongoing communication; and computer readable program code rendering the recorded data to the third entity at a render rate to transition the third entity from an asynchronous mode to a synchronous mode, after which the third entity participates in the ongoing communication between the first and second entity in real-time.

The present invention also provides for an article of manufacture comprising a computer usable medium having computer readable program code embodied therein, said medium comprising: computer readable program code aiding in establishing a first channel between a first entity and at least one second entity and establishing a second channel between the first entity and at least one third entity; computer readable program code aiding in recording data associated with the first and second channels; computer readable program code dynamically monitoring first, second, and third entities to identify if each of the first, second, or third entity is an active or inactive state; computer readable program code synchronously rendering the recorded data to entities in an active state; computer readable program code aiding in receiving an indication that an inactive entity has transitioned from an inactive state to an active state; computer readable program code identifying a render rate at which the recorded data are to be rendered for the entity that transitioned from the inactive state to the active state, and computer readable program code asynchronously rendering the recorded data to the entity that transitioned from the inactive state to the active state at the identified render rate.

The present invention provides for a method comprising the steps of: receiving a request from a third entity to join an ongoing communication between a first entity and a second entity, the first and second entity communicating in a synchronous mode while data are being recorded, said recorded data associated with the ongoing communication; transforming recorded data by discarding portions of recorded data based on preset rules; and rendering said transformed recorded data to the third entity to transition said third entity from an asynchronous mode to a synchronous mode, after which the third entity participates in said ongoing communication between the first and second entity in real-time.

The present invention also provides for a method in which a receiver of audio communications conducts multiple conversations that overlap in time, said method comprising: receiving and recording a first portion of a conversation with a first sender; receiving and recording a first portion of a conversation with a second sender; receiving and recording a second portion of a conversation with a first sender; receiving and recording a second portion of a conversation with a second sender; and alternatively sending audio responses to the first and second senders such that: 1) the receiver does not complete a conversation with the first sender until the receiver has sent a response to the first portion of the conversation with the second sender, and 2) the receiver does not complete a conversation with the second sender until the receiver has sent a response to the first portion of the conversation with the first sender.

BRIEF DESCRIPTION OF THE DRAWINGS

FIG. 2 illustrates a method for facilitating an entity joining an ongoing communication session over a network according to the teachings of the present invention.

DESCRIPTION OF THE PREFERRED EMBODIMENTS

Figure 1:
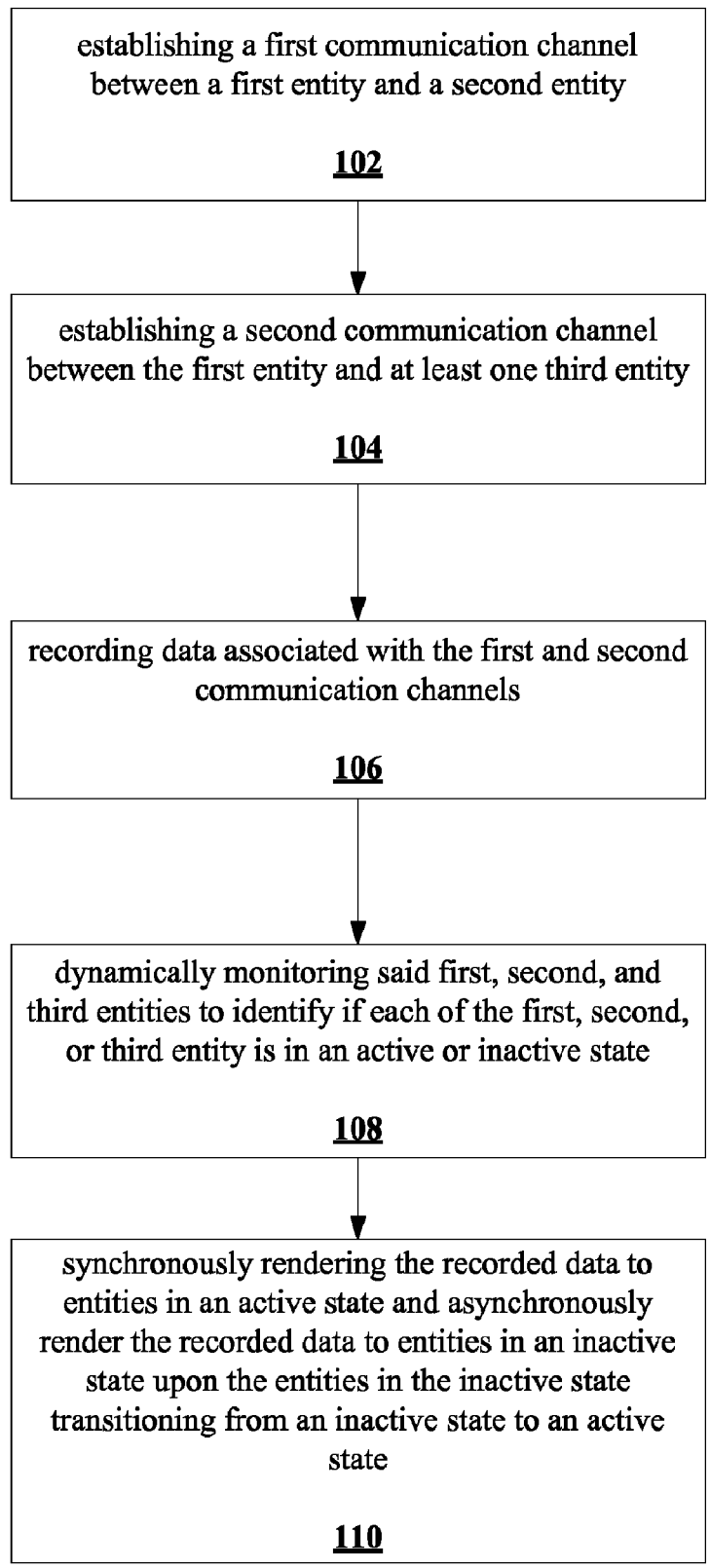
FIG. 1 illustrates a method of the present invention for simultaneously performing synchronous or asynchronous communications over a network.

While this invention is illustrated and described with respect to preferred embodiments, the invention may be produced in many different configurations. There is depicted in the drawings, and will herein be described in detail, preferred embodiments of the invention, with the understanding that the present disclosure is to be considered as an exemplification of the principles of the invention and the associated functional specifications for its construction and is not intended to limit the invention to the embodiments illustrated. Those skilled in the art will envision many other possible variations within the scope of the present invention.

Although the specification is replete with examples how the present invention is implemented with audio communications, it should be noted that the present invention applies to other forms of communication, such as video and text. Hence, the type of communication should not be used to limit the scope of the present invention.

FIG. 1 illustrates a method of the present invention. According to the method of FIG. 1, simultaneous synchronous or asynchronous communications are performed as follows:

step 102—establishing a first communication channel between a first entity and at least one second entity;

step 104—establishing a second communication channel between the first entity and at least one third entity;

step 106—recording data associated with the first and second communication channels;

step 108—dynamically monitoring first, second, and third entities to identify if each of the first, second, or third entity is in an active or inactive state, and step 110—synchronously rendering the recorded data to entities in an active state and asynchronously render the recorded data to entities in an inactive state upon the entities in the inactive state transitioning from an inactive state to an active state.

FIG. 2 illustrates a method facilitating an entity joining an ongoing communication session over a network according to the teachings of the present invention. According to the method of FIG. 2, an entity is allowed to join an ongoing communication session as follows:

step 202—receiving a request from a third entity to join an ongoing communication between a first entity and a second entity communicating in a synchronous mode while data are being recorded, the recorded data associated with the ongoing communication; and step 204—rendering the recorded data to the third entity at a render rate to transition the third entity from an asynchronous mode to a synchronous mode, after which the third entity participates in the ongoing voice communication between the first and second entity in real-time. For example, in an audio communications scenario, the render rate could be twice the speed at which real-time audio is played back.

Figure 3:
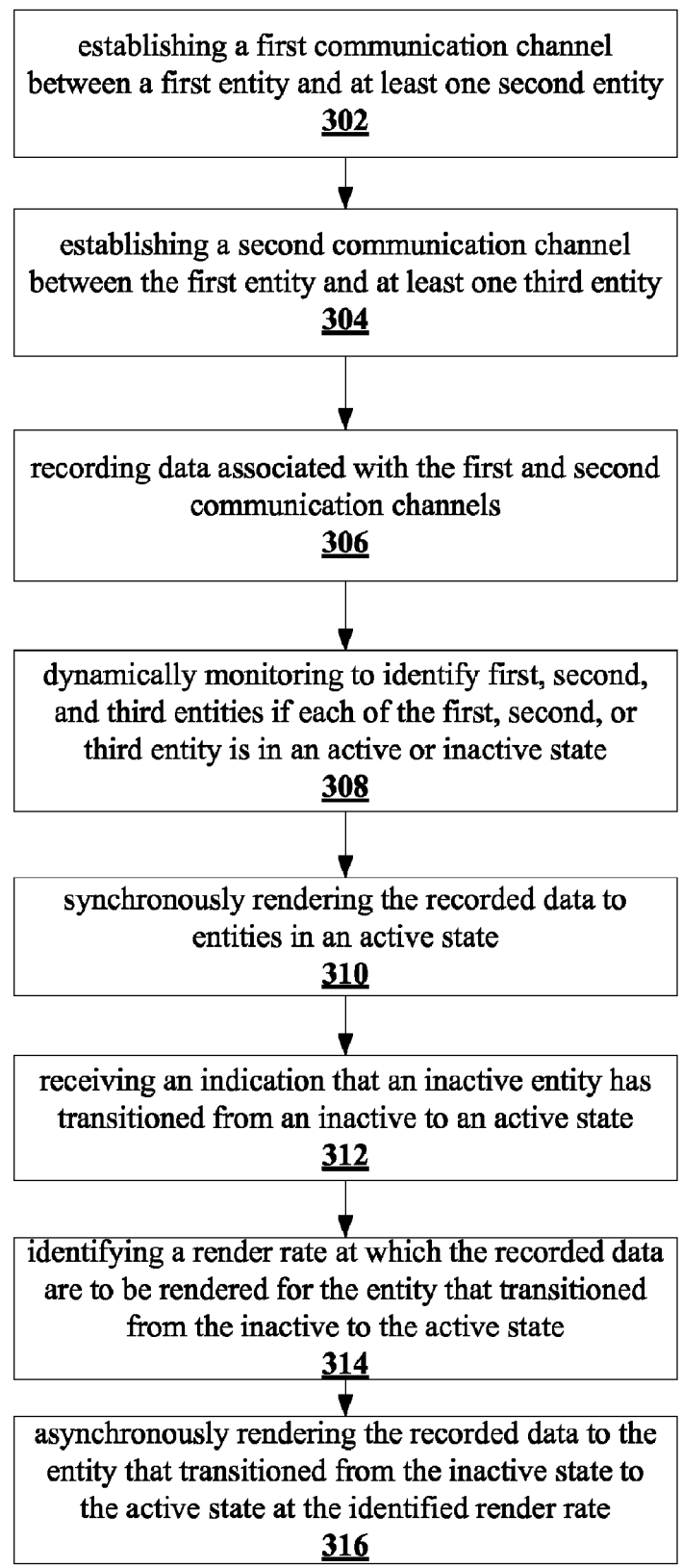
FIG. 3 illustrates another embodiment of the present invention to time-shift synchronous or asynchronous communications over a network.

FIG. 3 illustrates another embodiment of the present invention to time-shift synchronous or asynchronous communications, wherein the method is implemented as follows:

step 302—establishing a first channel between a first entity and at least one second entity;

step 304—establishing a second channel between the first entity and at least one third entity;

step 306—recording data associated with the first and second communication channels;

step 308—dynamically monitoring first, second, and third entities to identify if each of the first, second, or third entity is an active or inactive state;

step 310—synchronously rendering the recorded data to entities in an active state;

step 312—receiving an indication that an inactive entity has transitioned from an inactive state to an active state;

step 314—identifying a render rate (e.g., audio playback at twice the speed at which normal or real-time audio is rendered) at which the recorded data are to be rendered for the entity that transitioned from the inactive state to the active state, and step 316—asynchronously rendering the recorded data to the entity that transitioned from the inactive state to the active state at the identified render rate.

In the instance the recorded data are voice data, the present invention solves the problems associated with the prior art by combining the arbitrary selection of communication synchrony found in instant messaging with the simplicity and richness of voice communications. This combination of features effectively allows users to carry-on multiple voice and/or text based communications simultaneously. The present invention can do this by using an instant messaging interface to receive and send voice "clips" or chunks of conversation that can be heard in real-time or listened to later, when it is more convenient. In this way, the user can control the synchrony level of the conversion (i.e., the speed of conversational turn-taking), and direct attention to different conversation streams as needed. If a key point is missed in one conversation, the user can simply playback one or more clips. If a particular meeting is not interesting or relevant, the user can reduce the attention given to the meeting while still being "present" at the meeting.

In one scenario, the sender can select one or more people in a "buddy list" and a voice channel window opens indicating that the voice channel to that person (or persons) is open. The sender then merely speaks, and the data are sent to the receiver. If the receiver has a voice channel window already open for the sender, he or she will hear the sender's voice and be able to respond verbally right-away without an additional action (i.e., automatic bidirectional duplex communication). The conversation can then proceed as if it were a standard phone call from this point on. If the receiver does not have an open channel to the sender or if the receiver is not available, he or she will not hear the sender but will receive an icon indicating that something was said. Upon clicking the icon, the receiver can listen to the voice clip. If the receiver has a voice channel window open but only wants to listen to the sender without verbally replying, the receiver can press the mute button.

A non-exhaustive list of benefits of the present invention include:

1. Seamless transition from synchronous to asynchronous communication. Typical phone calls are a form of synchronous communication because one's full attention and timely response are required during the communication session. This can be a problem in high pressure environments where people do not have time for lengthy phone calls but just need a short communication to get needed information. In these situations, a person may avoid answering phone calls because of the danger of getting trapped in a conversation. The present invention solves this problem by allowing people to transition in and out of synchronous communication as needed. For example, if someone has a complex question, he or she can simply state the question. If the other person is available, he or she can respond immediately with the answer and the conversation can continue until the problem is solved. If the other person is unavailable, he or she can respond when time permits (asynchronous communication).

2. Quick and easy voice communication. Communicating complex problems and situations across email or IM can be time consuming and involves quite a bit of effort. It is often easier to verbally state the situation and provide details as needed. The present invention allows people to use voice communication without the interruption of the phone and without relying on speech recognition to transfer voice information textually.

3. Ability to hold multiple voice interactions simultaneously. Current text-based instant messaging systems allow people to have asynchronous communication and thus, multiple conversions can be managed simultaneously. In the same manner, the current invention supports asynchronous voice communications, allowing people to manage multiple voice interactions at the same time. Such may be needed in cases where very high levels of coordination are needed while working on complex projects. Thus, the current invention provides a way that a person could, for example, talk to the customer, listen to the support team trouble-shooting the problem, and talk to a system administrator who can quickly make the changes needed to fix the problem.

Figure 4:
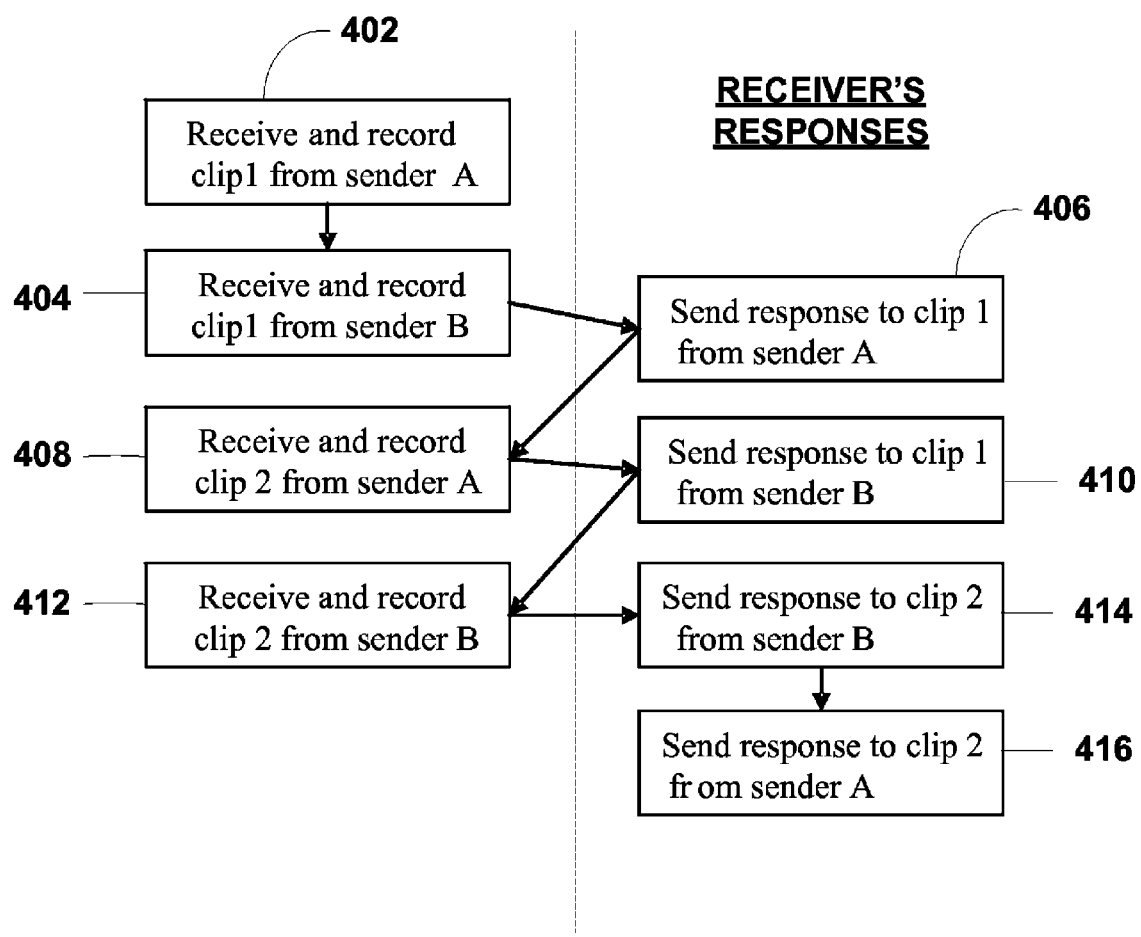
FIG. 4 illustrates an example showing the management of simultaneous voice communication channels from different senders.

One embodiment of the present invention is depicted in FIG. 4 showing an example of the management of simultaneous voice communication channels from different senders. The receiver can handle multiple voice conversations because each voice clip that is sent is recorded and displayed dynamically. The speed of responding will depend on the number of senders and the semantic complexity of the conversion. FIG. 4 shows that sender A first speaks to the receiver (wherein the speech data from sender A is received and recorded, as in 402) and then sender B speaks immediately after sender A (wherein sender B's voice data are received and recorded, as in 404). The receiver having heard sender A and B responds to sender A first (as shown in 406). Sender A then speaks again, wherein the speech data are received and recorded (as shown in 408). The receiver takes a quick moment to acknowledge sender B (as shown in 410). Sender B then asks a more substantial question, wherein the voice data are received and recorded (as shown in 412). The receiver answers sender B's question (as shown in 414) and then is able to finish the conversation with sender A (as shown in 416).

Figure 5:
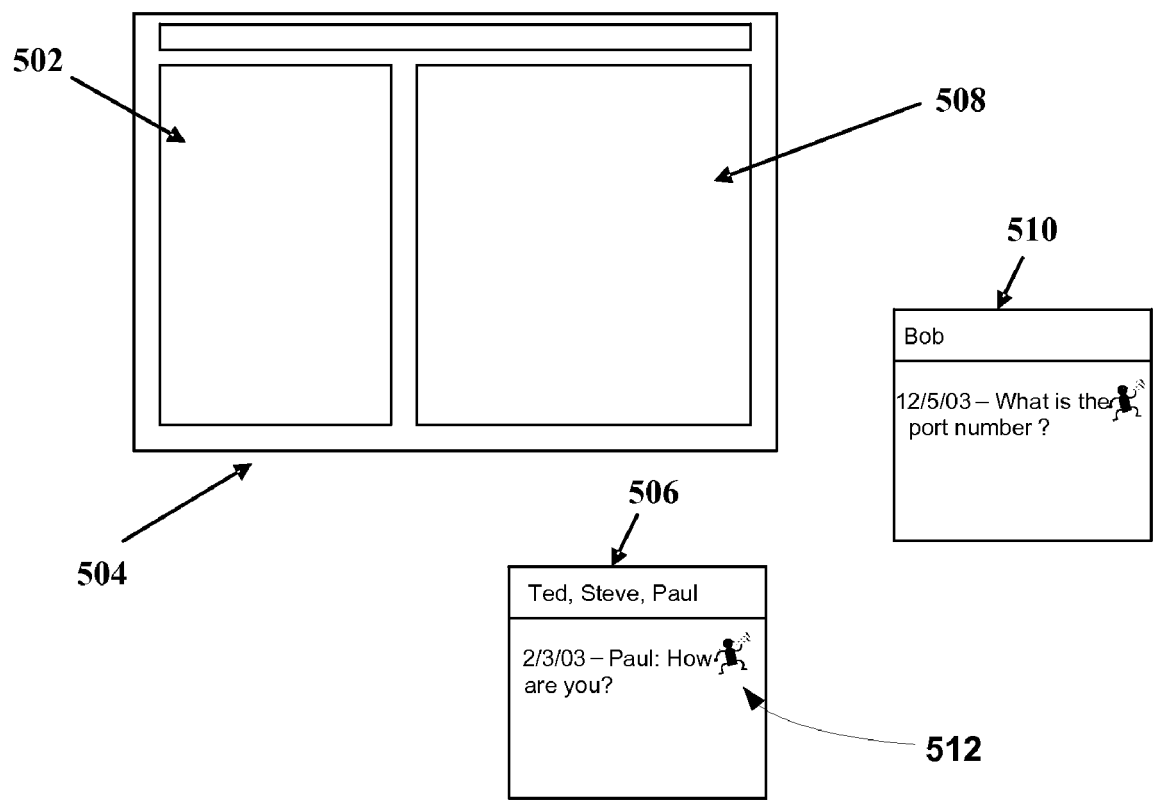
FIG. 5 shows an example of a user interface used in conjunction with the present invention.

FIG. 5 shows an example of a user interface used in conjunction with the present invention. The primary application window contains the buddy list 502 and the conversation history panels 508. The buddy list 502 is simply a list of people with whom the user normally interacts. The conversation history panel 508 provides a view of past conversations that have been archived and can be replayed or transferred to another device for listening. The voice channel window 506, 510 provides a control point for each individual channel or conversation. When a voice clip is received, the sender's name appears with a clip icon next to it. If the application has Automatic Speech Recognition, the icon 512 may be preceded with text.

In another embodiment, the voice channel window 506, 510 that has focus (i.e., currently selected and active) is the one that automatically sends anything that is said and automatically plays any voice clips received. A conversation is initiated when the sender selects a receiver or receivers from the buddy list 502. This causes the opening of a voice channel window on the screen and the initialization of a network voice data stream. The network voice data stream is created by taking data from the buddy list database that contains the IP address of the receiver and building UDP packets addressed to the receiver given that IP address on port 5000. If the sender is speaking, then the voice data are collected via imbedded DAC (digital to analog converter), digitized, and compressed before being added to the UDP packets and sent over the network. The receiver's client is always listening for incoming UDP packets on port 5000. When UDP packets arrive, they are decompressed and, if the voice channel window is open on the receiver's screen for that specific sender, the UDP packets are sent to the standard audio output device to be played. The receiver's client may get UDP packets from many senders at the same time and, if voice channel windows are open for all the senders, then the voice data would be played simultaneously through the audio output device. This would be similar to being in a crowded room with many people speaking at once. The receiver can easily control to whom he or she wishes to listen by simply closing or minimizing voice channel windows 506, 510. If the receiver wants to put all the senders into the same room so that the senders can hear each other speak, the receiver can simply enclose all the voice channel windows with a rubber band selection box and (right-click) select "group" from the pop-up menu. This merges all the voice channel windows into one window with all the senders listed at the top. Alternatively, if the receiver wants to talk to a sender separately, the receiver can right-click and select "Ungroup all", "Ungroup a sender" or "Create a sidebar conversation". Ungrouping removes senders from the room so that the senders cannot hear or talk to other senders. Creating a sidebar leaves the sender in the room but creates a new voice channel window for a private conversation between sender and receiver.

This grouping functionality allows the user to create one or more "rooms" that act like standard conference calls. But, unlike typical conference calls, the present invention makes it is easy to participate in multiple group discussions simultaneously, create breakout discussion groups, have private sidebar conversations, or dynamically invite new participants to the conversation. Dynamically inviting participants is as simple as selecting a name on the buddy list and dragging it to an open voice channel window. If the new participant is not available to talk, the present invention will record the conversation so that the new participant can listen to it at a later time and respond when more convenient.

The present invention provides a great deal of flexibility for the receiver of voice communications by allowing conversations to be partially attended or recorded for later review. For example, the receiver may not have time for a meeting or talk but wants to listen to it later. In this case, the receiver can open a voice channel window for the speaker and then minimize the window. This will record the conversation and also provide an indication that the receiver is not actively involved. As one example, such an indication is shown by having the name of the person greyed-out. The receiver can also opt to join the meeting in progress by playing the conversation that has already transpired at increased speed until the receiver has caught-up. This can be particularly useful if one arrives at a meeting late or has to leave early. In fact, the first 10 minutes of a meeting can be critical as the context, purpose, and goals of the meeting are usually covered in this time. In addition, the last 10 minutes are also important as conclusions are stated and action items are outlined. With the export function, the receiver can copy the meeting to a mobile audio player and review meetings while traveling. This is much more convenient than trying to open a laptop and obtain an email with meeting notes.

Figure 6:
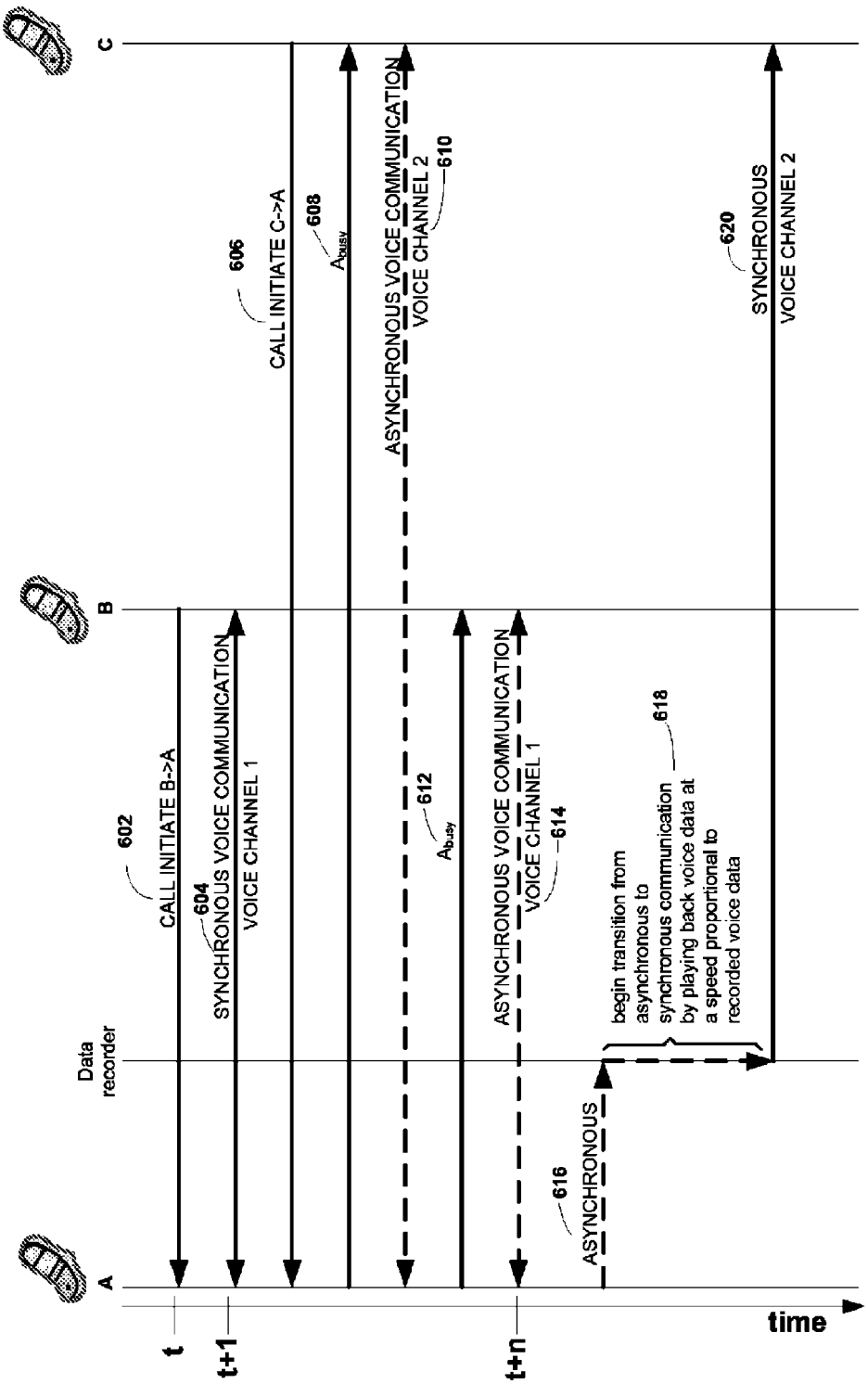
FIG. 6 illustrates how the present invention's teachings can also be specifically implemented in a cellular communications scenario.

The teachings of the present invention can also be specifically implemented in a cellular communications scenario. FIG. 6 illustrates such a scenario. In step 602, B initiates a call over a cellular network. In step 604, a synchronous communication channel is established between A and B over the cellular network. Because A has the channel open with B, he/she hears B speak in real-time. In one specific implementation, when A's channel is open to B, B hears a high chirp sound when pressing the send button and/or sees the name/picture of A indicating that A is available. In step 606, C initiates a call to A and, as A is busy participating in a conversation with B (step 608), in step 610, establishes an asynchronous communication channel with A represented by the dotted line). Next, when A notices that C is in asynchronous communication, A issues a busy message in step 612 to B. In a specific implementation, when A is busy, C hears a low chirp sound when pressing the send button and/or sees the name/picture of A indicating that A's channel is not open to C. C then gives more information about what the call is about (where this information is recorded for playback later) and goes on about other business not expecting a real-time response from A. Meanwhile, A hears a chirp or ring-tone associated with C and/or an indication on the phone display, showing that C sent voice data. A then moves from the previously synchronous communication mode with B into an asynchronous communication mode with B as in 614. Next, A transitions from an asynchronous communication mode 616 with C to a synchronous communication mode 620 with C by playing back recorded data voice data 618. In one specific implementation, A can choose to switch to the voice channel of C by pressing a "cycle through active channels" button or by selecting a person on the graphical display. If A switches to voice channel of C, A hears a name, chirp, sound, or sees a visual indication of the person whose channel A selected. Then, the recorded voice data are played back at a speed proportional to the amount of voice data recorded—i.e., a large amount of voice data are played back faster than a small amount. The playback speed does not exceed an upper limit, however, based on studies of a human's ability to hear and comprehend speech at different rates. While A is listening to C's recorded voice data, the voice data from B are recorded.

In this implementation, the "cycle though active channels" button is a user interface (UI) convenience for the limitations imposed by cell phones and other mobile devices. Active channels are defined by the user prior to using the cell phone and are composed of a list of people with whom the user wishes to interact. People are temporarily added to the list when he or she sends voice data. When some one's voice data are heard he or she is then removed from the list. The list is sorted by most recent voice data transmission and whether or not the voice data were heard or not, e.g., unheard listed people are top of the list, followed by unheard unlisted people, and finally heard listed people. The cycle button switches to the voice channel for the next person on the list from top to bottom every time it is depressed. When the user switches to a new channel, some identification of the channel is given, e.g., the name of the person is spoken, a chirp, sound, or ring tone is heard, and/or a visual display shows the person's name or face.

Figure 7A:
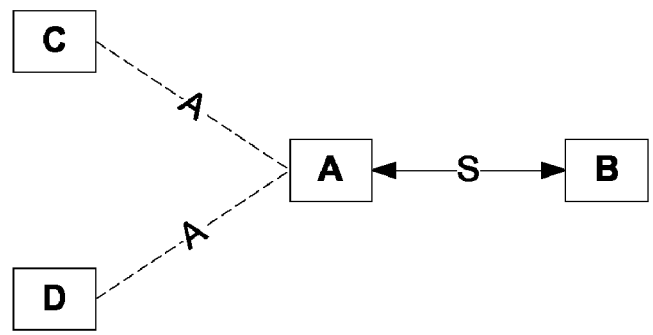
FIGS. 7*a-c* illustrate various embodiments of the present invention.
Figure 7B:
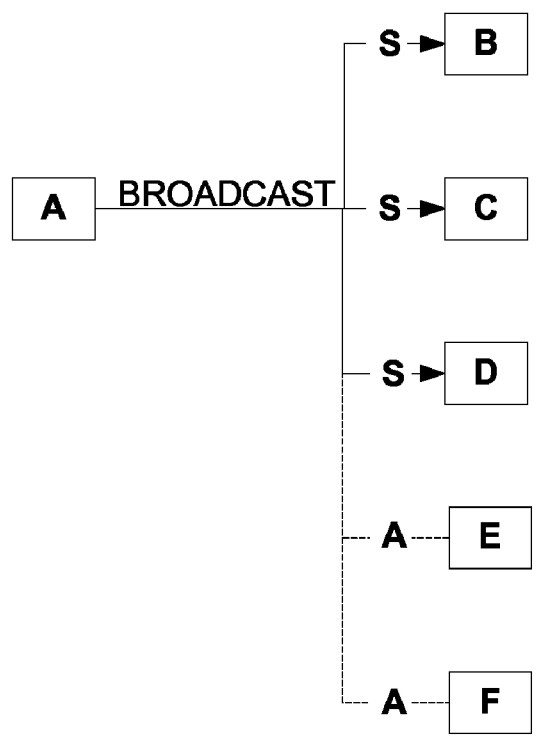
Figure 7C:
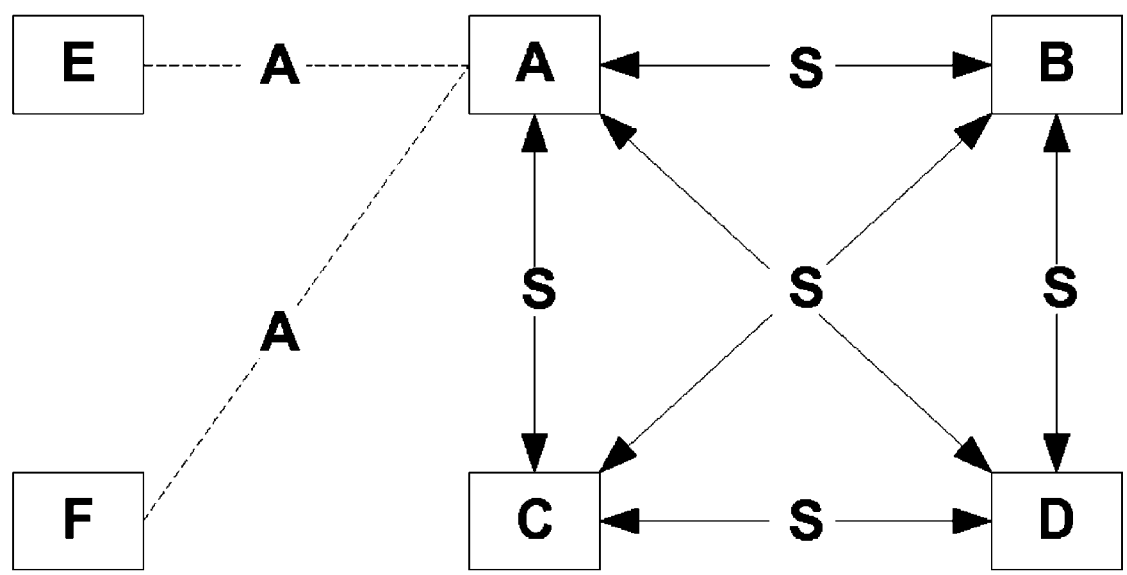

FIGS. 7*a-c* illustrate various embodiments of the present invention. FIG. 7*a* illustrates managed communications between person to person(s) with zero or one synchronous channel and zero or many asynchronous channels. In the example, C and D are in asynchronous communication with A, and A is in synchronous communication with B. A can at any time move from the asynchronous communication mode with respect to C or D by playing recorded data.

FIG. 7*b* illustrates a broadcast voice communications scenario wherein A broadcasts in a synchronous communication mode with respect to B, C, and D, while E, and F are participating in an asynchronous communication mode. D and F can transition from the asynchronous mode to a synchronous mode by playing back recorded data.

FIG. 7*c* illustrates a conference voice communications scenario. In this conference communication scenario, A, B, C, and D are all engaged in a conference call in a synchronous mode, while E and F are participating in an asynchronous communication mode. E and/or F can transition to a synchronous mode with the conference call by playing back recorded data.

It is worth reemphasizing that although the specification is replete with examples how the present invention is implemented with audio communications, the present invention may be used with other forms of communication, such as video and text. Hence, the type of communication should not be used to limit the scope of the present invention.

The present invention provides for an article of manufacture comprising computer readable program code implementing one or more modules aiding in conducting simultaneous communications. Furthermore, the present invention includes a computer program code-based product, which is a storage medium having program code stored therein which can be used to instruct a computer to perform any of the methods associated with the present invention. The computer storage medium includes any of, but is not limited to, the following: CD-ROM, DVD, magnetic tape, optical disc, hard drive, floppy disk, ferroelectric memory, flash memory, ferromagnetic memory, optical storage, charge coupled devices, magnetic or optical cards, smart cards, EEPROM, EPROM, RAM, ROM, DRAM, SRAM, SDRAM, or any other appropriate static or dynamic memory or data storage devices.

Implemented in computer program code based products are software modules: (a) aiding in establishing a first communication channel between a first entity and at least one second entity and establishing a second communication channel between the first entity and at least one third entity; (b) aiding in recording data associated with the first and second communication channels; (c) dynamically monitoring first, second, and third entities to identify if each of the first, second, or third entity is in an active or inactive state, and (d) synchronously rendering the recorded data to entities in an active state and asynchronously rendering the recorded data to entities in an inactive state upon the entities in the inactive state transitioning from an inactive state to an active state.

Also implemented in computer program code based products are software modules: (a) aiding in receiving a request from a third entity to join an ongoing communication between a first entity and a second entity, the first and second entity communicating in a synchronous mode while data are being recorded, said recorded data associated with the ongoing communication; and (b) rendering the recorded data to the third entity at a render rate to transition the third entity from an asynchronous mode to a synchronous mode (e.g., in an audio communications scenario, playing back audio at twice the speed at which normal or real-time audio is rendered, thereby allowing the third entity to catch-up to the ongoing communication), after which the third entity participates in the ongoing communication between said first and second entity in real-time (e.g., in an audio communications scenario, playing back audio at twice the speed at which normal or real-time audio is rendered, thereby allowing the third entity to catch-up to the ongoing communication).

Also implemented in computer program code based products are software modules: (a) aiding in establishing a first channel between a first entity and at least one second entity and establishing a second channel between the first entity and at least one third entity; (b) aiding in recording data associated with the first and second channels; (c) dynamically monitoring first, second, and third entities to identify if each of the first, second, or third entity is an active or inactive state; (d) synchronously rendering the recorded data to entities in an active state; (e) aiding in receiving an indication that an inactive entity has transitioned from an inactive state to an active state; (f) identifying a render rate at which the recorded data are to be rendered for the entity that transitioned from the inactive state to the active state, and (g) asynchronously rendering the recorded data to the entity that transitioned from said inactive state to said active state at the identified render rate.

CONCLUSION

A system and method has been shown in the above embodiments for the effective implementation of a method for managing simultaneous electronic communications. While various preferred embodiments have been shown and described, it will be understood that there is no intent to limit the invention by such disclosure, but rather, it is intended to cover all modifications falling within the spirit and scope of the invention, as defined in the appended claims. For example, the present invention should not be limited by software/program, computing environment, or specific computing hardware.

The above enhancements are implemented in various computing environments. For example, the present invention may be implemented on a conventional IBM PC or equivalent, multi-nodal system (e.g., LAN) or networking system (e.g., Internet, WWW, wireless web). All programming and data related thereto are stored in computer memory, static or dynamic, and may be retrieved by the user in any of: conventional computer storage, display (i.e., CRT) and/or hardcopy (i.e., printed) formats. The programming of the present invention may be implemented by one of skill in the art of communications.

We claim:

1. A method comprising:
   establishing a first communication channel between a first entity and at least one second entity and establishing a second communication channel between said first entity and at least one third entity;
   recording data associated with said first and second communication channels;
   dynamically monitoring said first, second, and third entities to identify if each of said first, second, or third entity is in an active or inactive state,
   synchronously rendering said recorded data to entities in an active state;
   identifying a render rate at which said recorded data are to be rendered for an entity that transitions from an inactive state to an active state;
   asynchronously rendering said recorded data to said entity that transitions from said inactive state to said active state at said identified render rate; and
   wherein, prior to said asynchronous rendering, said identified render rate is compared against a pre-determined threshold, and if said identified render rate is greater than said pre-determined threshold, then the identified render rate is reset to said pre-determined threshold, else no change is made to said identified render rate.

2. The method of claim 1, wherein said recorded data are audio data.

3. The method of claim 1, wherein said recorded data are video data.

4. The method of claim 1, wherein said recorded data are text data.

5. The method of claim 2, wherein said recorded audio data are transformed to text via a speech recognition process prior to being asynchronously rendered to entities that have transitioned from said inactive state to said active state.

6. The method of claim 1, wherein channels are established over any of the following: a TCP/IP-based network, a cellular network, a local area network, and a wide area network.

7. The method of claim 1, wherein said recorded data are encrypted and compressed prior to storage.

8. The method of claim 1, wherein said synchronous and/or asynchronous rendering is done via a graphical playback interface, said graphical playback interface including controls for any of, or a combination of the following: play, rewind, stop, replay, and stream processing.

9. The method of claim 1, wherein, prior to said asynchronous rendering, recorded data are subject to stream processing comprising any of the following: time compression, time expansion, silence removal, and noise reduction.

10. The method of claim 1, wherein said recorded data are forwarded to at least one entity in an inactive state in a format compatible with playback in a portable device.

11. A method comprising:
    receiving a request from a third entity to join an ongoing communication between a first entity and a second entity, said first and second entity communicating in a synchronous mode while data are being recorded, said recorded data associated with said ongoing communication; and
    rendering said recorded data to said third entity at a render rate to transition said third entity from an asynchronous mode to a synchronous mode, after which said third entity participates in said ongoing communication between said first and second entity in real-time,
    wherein, prior to said recorded data being rendered, said render rate is compared against a pre-determined threshold, and if said render rate is greater than said pre-determined threshold, then the render rate is changed to said pre-determined threshold, else no change is made to the render rate.

12. The method of claim 11, wherein said recorded data are audio data.

13. The method of claim 11, wherein said recorded data are video data.

14. The method of claim 11, wherein said recorded data are text data.

15. The method of claim 12, wherein said recorded audio data are transformed to text via a speech recognition process prior to being asynchronously rendered to entities that have transitioned from said inactive state to said active state.

16. The method of claim 11, wherein communication is established using any of the following: a TCP/IP-based network, a cellular network, a local area network, and a wide area network.

17. The method of claim 11, wherein said recorded data are encrypted and compressed prior to storage.

18. The method of claim 11, wherein synchronous and/or asynchronous rendering is done via a graphical playback interface, said graphical playback interface including controls for any of, or a combination of the following: play, rewind, stop, replay, and stream processing.

19. The method of claim 11, wherein, prior to said rendering, recorded data are subject to stream processing comprising any of the following: time compression, time expansion, silence removal, and noise reduction.

20. The method of claim 11, wherein said recorded data are forwarded to at least one entity in an asynchronous mode in a format compatible for playback in a portable device.

21. A method comprising:
    establishing a first channel between a first entity and at least one second entity and establishing a second channel between said first entity and at least one third entity;
    recording data associated with said first and second channels;
    dynamically monitoring said first, second, and third entities to identify if each of said first, second, or third entity is in an active or inactive state;

synchronously rendering said recorded data to entities in an active state;

receiving an indication that an inactive entity has transitioned from an inactive state to an active state;

identifying a render rate at which said recorded data are to be rendered for said entity that transitioned from said inactive state to said active state, and asynchronously rendering said recorded data to said entity that transitioned from said inactive state to said active state at said identified render rate, wherein, prior to said recorded data being asynchronously rendered, said identified render rate is compared against a pre-determined threshold, and if said identified render rate is greater than said pre-determined threshold, then the identified render rate is changed to said pre-determined threshold, else no change is made to the identified render rate.

22. The method of claim 21, wherein said recorded data are audio data.

23. The method of claim 21, wherein said recorded data are video data.

24. The method of claim 21, wherein said recorded data are text data.

25. The method of claim 22, wherein said recorded audio data are transformed to text via a speech recognition process prior to being asynchronously rendered to entities that have transitioned from said inactive state to said active state.

26. The method of claim 21, wherein channels are established using any of the following: a TCP/IP-based network, a cellular network, a local area network, and a wide area network.

27. The method of claim 21, wherein said recorded data are encrypted and compressed prior to storage.

28. The method of claim 21, wherein said synchronous and/or asynchronous rendering is done via a graphical playback interface, said graphical playback interface including controls for any of, or a combination of the following: play, rewind, stop, replay, and stream processing.

29. The method of claim 21, wherein, prior to said asynchronous rendering, recorded data are subject to stream processing comprising any of the following: time compression, time expansion, silence removal, and noise reduction.

30. The method of claim 21, wherein said recorded data are forwarded to at least one entity in an inactive state in a format compatible for playback in a portable device.

31. An article of manufacture comprising a computer usable medium having computer readable program code embodied therein, said medium comprising:

computer readable program code aiding in establishing a first communication channel between a first entity and at least one second entity and establishing a second communication channel between said first entity and at least one third entity;

computer readable program code aiding in recording data associated with said first and second communication channels;

computer readable program code dynamically monitoring said first, second, and third entities to identify if each of said first, second, or third entity is in an active or inactive state;

computer readable program code asynchronously rendering said recorded data to said entity that transitions from said inactive state to said active state at said identified render rate; and wherein, prior to said asynchronous rendering, computer readable program code comparing said identified render rate against a pre-determined threshold, and if said identified render rate is greater than said pre-determined threshold, then the identified render rate is reset to said pre-determined threshold, else no change is made to said identified render rate.

32. An article of manufacture comprising a computer usable medium having computer readable program code embodied therein, said medium comprising:

computer readable program code aiding in receiving a request from a third entity to join an ongoing communication between a first entity and a second entity, said first and second entity communicating in a synchronous mode while data are being recorded, said recorded data associated with said ongoing communication; and computer readable program code rendering said recorded data to said third entity at a render rate to transition said third entity from an asynchronous mode to a synchronous mode, after which said third entity participates in said ongoing communication between said first and second entity in real-time, wherein, prior to said recorded data being rendered, computer readable program code compares said render rate against a pre-determined threshold, and if said render rate is greater than said pre-determined threshold, then the render rate is changed to said pre-determined threshold, else no change is made to the render rate.

33. An article of manufacture comprising a computer usable medium having computer readable program code embodied therein which implements a method to time-shift synchronous or asynchronous communications comprising:

computer readable program code aiding in establishing a first channel between a first entity and at least one second entity and establishing a second channel between said first entity and at least one third entity;

computer readable program code aiding in recording data associated with said first and second channels;

computer readable program code dynamically monitoring first, second, and third entities to identify if each of said first, second, or third entity is an active or inactive state;

computer readable program code synchronously rendering said recorded data to entities in an active state;

computer readable program code aiding in receiving an indication that an inactive entity has transitioned from an inactive state to an active state;

computer readable program code identifying a render rate at which said recorded data are to be rendered for said entity that transitioned from said inactive state to said active state, and computer readable program code asynchronously rendering said recorded data to said entity that transitioned from said inactive state to said active state at said identified render rate, wherein, prior to said recorded data being asynchronously rendered, computer readable program code compares said identified render rate against a pre-determined threshold, and if said identified render rate is greater than said pre-determined threshold, then the identified render rate is changed to said pre-determined threshold, else no change is made to the identified render rate.

34. A method comprising:

receiving a request from a third entity to join an ongoing communication between a first entity and a second entity, said first and second entity communicating in a synchronous mode while data are being recorded, said recorded data associated with said ongoing communication;

transforming recorded data by discarding portions of recorded data based on preset rules; and rendering said transformed recorded data to said third entity to transition said third entity from an asynchronous mode to a synchronous mode, after which said third entity participates in said ongoing communication between said first and second entity in real-time.

35. The method of claim 34 wherein said preset rules are any of the following: discard recorded data at pre-determined intervals of time, discarding recorded data after a predetermined time value, and discarding recorded data before a predetermined time value.

36. A method in which a receiver of audio communications conducts multiple conversations that overlap in time, said method comprising:
receiving and recording a first portion of a conversation with a first sender;
receiving and recording a first portion of a conversation with a second sender;
receiving and recording a second portion of a conversation with a first sender;
receiving and recording a second portion of a conversation with a second sender; and
alternatively sending audio responses to the first and second senders such that: 1) the receiver does not complete a conversation with the first sender until the receiver has sent a response to the first portion of the conversation with the second sender, and 2) the receiver does not complete a conversation with the second sender until the receiver has sent a response to the first portion of the conversation with the first sender.

37. The method of claim 36, wherein the receiver controls the speed at which a given conversation takes place.

38. The method of claim 37, wherein the method further comprises the step of listening to recorded portions.

* * * * *